United States Patent
Ettinger et al.

(10) Patent No.: US 9,291,460 B2
(45) Date of Patent: Mar. 22, 2016

(54) MAP PROCESSING FOR INDOOR NAVIGATION GUIDANCE

(75) Inventors: Scott Ettinger, San Carlos, CA (US); Ehud Rivlin, Haifa (IL)

(73) Assignee: Google Inc., Mountain View, CA (US)

( * ) Notice: Subject to any disclaimer, the term of this patent is extended or adjusted under 35 U.S.C. 154(b) by 612 days.

(21) Appl. No.: 13/188,798

(22) Filed: Jul. 22, 2011

(65) Prior Publication Data

US 2015/0153180 A1    Jun. 4, 2015

(51) Int. Cl.
*G01C 21/20* (2006.01)

(52) U.S. Cl.
CPC ..................... *G01C 21/206* (2013.01)

(58) Field of Classification Search
CPC ............. G01C 21/206; G01C 21/0005; G01C 21/005; G06K 9/469; G06K 9/00671; G06K 9/6232
USPC .......... 701/434, 455, 532–533, 410; 342/458, 342/451
See application file for complete search history.

(56) References Cited

U.S. PATENT DOCUMENTS

| | | | |
|---|---|---|---|
| 7,250,907 B2 * | 7/2007 | Krumm et al. ................ | 342/451 |
| 8,320,939 B1 | 11/2012 | Vincent | |
| 8,554,464 B2 * | 10/2013 | Zetune .......................... | 701/400 |
| 8,825,388 B2 * | 9/2014 | Khorashadi et al. .......... | 701/434 |
| 2008/0293431 A1 | 11/2008 | Buerger et al. | |
| 2009/0292465 A1 * | 11/2009 | Kaldewey et al. ............ | 701/209 |
| 2011/0320583 A1 | 12/2011 | Parker et al. | |

OTHER PUBLICATIONS

Mann Hung V. Le, Dimitris Saragas, Nathan Webb, Indoor Navigation System for Handheld Devices, Oct. 22, 2009, 133 pages.
Paulo Pombinho, Ana Paula Afonso, and Maria Beatriz Carmo, Indoor Positioning Using a Mobile Phone With an Integrated Accelerometer and Digital Compass, 4 pages, Sep. 9-10, 2010.
Yiguang Xuan, Raja Sengupta, and Yaser Fallah, Crowd Sourcing Indoor Maps With Mobile Sensors, 2010, 12 pages.

* cited by examiner

*Primary Examiner* — Nga X Nguyen
(74) *Attorney, Agent, or Firm* — Lerner, David, Littenberg, Krumholz & Mentlik, LLP (57) ABSTRACT

Directions are provided to a location in an indoor space in response to receiving a request from a mobile device. First, a map of the indoor space is processed to identify navigable areas in the indoor space. A distance transform is then executed on the map as part of a process to generate a directed graph. The directed graph includes nodes that correspond to points in the indoor space and paths that correspond to routes between the nodes. Next, a navigation table is generated based on the directed graph to identify a shortest route from each node to at least one other node. In response to a request for directions to a location in the indoor space, the navigation table is accessed to identify a route to the requested location. The identified route is then provided to a mobile device such that an end user may navigate to the location.

17 Claims, 6 Drawing Sheets

MAP PROCESSING FOR INDOOR NAVIGATION GUIDANCE

BACKGROUND

Global Positioning System (GPS) technology is commonly used for providing directions to outdoor locations. However, GPS is not useful for providing directions to indoor locations because signals from GPS satellites are generally not powerful enough to penetrate most buildings or other structures that create indoor environments. In order to provide directions to indoor locations, traditional techniques required manual processing to identify different routes to specific locations. However, this manual process is laborious and, in many cases, ineffective since directions can only be provided to locations along specific routes that were manually processed.

SUMMARY

Aspects of the present disclosure relate generally to electronic map processing to provide navigation guidance in an indoor space. A map of the indoor space is processed to produce a directed graph for navigation path planning. The directed graph includes different nodes that correspond to different points in the indoor space and paths that correspond to routes between the nodes. When an end user requests directions to a location in the indoor space, a navigation table constructed based on the directed graph is accessed to identify the shortest route to the requested location. The end user is then provided with a mobile-accessible version of the map of the indoor space that indicates the shortest route to the requested location.

In one aspect, a computer-implemented method includes accessing a preliminary map associated with an indoor space. The preliminary map is converted into a segmented map using a processor. The segmented map distinguishes a navigable area of the indoor space from a non-navigable area of the indoor space. A directed graph corresponding to the indoor space is generated based on the segmented map using the processor. The directed graph includes a plurality of nodes connected by a plurality of paths. The plurality of nodes corresponds to points in the navigable area of the indoor space and the plurality of paths corresponds to routes between the points in the navigable area of the indoor space. The directed graph is stored for subsequent access to identify a route between two locations in the indoor space.

In another aspect, a computer-implemented method for processing a map to provide guidance for navigating an indoor space includes identifying, using a processor, a distance between each point in a navigable area to a nearest point in a non-navigable area of the indoor space. A likelihood that a route would pass through a specific point in the navigable area is identified. The likelihood corresponds to a value that is associated with the specific point. A directed graph corresponding to the indoor space is generated, using the processor, based on the likelihood values of the specific points in the navigable area. The directed graph includes a plurality of nodes connected by a plurality of paths. The plurality of nodes corresponds to a minimum set of the specific points in the indoor area that are associated with a value that indicates a high likelihood that a route would pass through the specific point in the navigable area. The plurality of paths corresponds to routes between the specific points in the navigable area of the indoor space. A navigation table is generated based on the directed graph. The navigation table is stored for subsequent access to identify a route between two locations in the indoor space.

In another aspect, a system for providing directions to a location in an indoor space includes means for executing a distance transform on a map of the indoor space as part of a process to generate a distance map. The distance map identifies a distance between each point in the navigable area of the indoor space to a nearest point in a non-navigable area of the indoor space. The system also includes means for identifying a likelihood that a route would pass through a specific point in the navigable area. The likelihood corresponds to a value that is associated with the specific point. The system also includes means for generating a directed graph including a plurality of nodes connected by a plurality of paths. The plurality of nodes corresponds to individual points in the navigable area of the indoor space and the plurality of paths corresponds to routes between the individual points in the navigable area of the indoor space. The plurality of nodes corresponds to a minimum set of the specific points in the indoor area that are associated with a value that indicates a high likelihood that a route would pass through the specific points in the navigable area. The system also includes means for generating a navigation table based on the directed graph. The system also includes means for accessing the navigation table in response to a request for directions to a location in the indoor space. A route to the location is determined from the navigation table. The system also includes means for providing the directions corresponding to the route to a mobile device.

DETAILED DESCRIPTION

The present disclosure is directed to providing navigable routes to locations in an indoor space. A map of the indoor space is processed to provide a vectorized version of the map that identifies areas in the indoor space that are likely to be on a route to locations in the indoor space. The navigable areas of the indoor space are distinguished on the map from areas that cannot be occupied by a person.

After the map is processed to identify the navigable areas of the indoor space, a distance transform is executed at different points in the navigable area of the map to identify routes that a person would mostly likely use to move through the area. For example, a point in a middle of a room or a center of an open area would be assigned a higher value than a point proximate a corner of a room or along a wall. A first node is placed at a point with the highest distance transform value to generate a directed graph that corresponds to the navigable area. The map is processed to identify different junctions in the indoor space and to determine all possible routes connecting the junctions.

After the junctions are identified, different routes are established between the junctions based on a minimum cost path analysis to identify a minimum set of nodes and paths between the nodes that can be used to navigate the indoor space. The result is a directed graph that connects the minimum set of nodes via the paths to link each location on the map to other locations that a person may want to access or occupy in the indoor space. A navigation table is constructed based on the directed graph to identify a shortest route between different locations in the indoor area. In response to an end user request for directions to a location in the indoor space, dynamic programming is performed on the navigation table to determine an optimal (e.g., shortest) route to the requested location. The end user may then be provided with a mobile-accessible version of the map that indicates the optimal route to the desired location in the indoor space.

Figure 1:
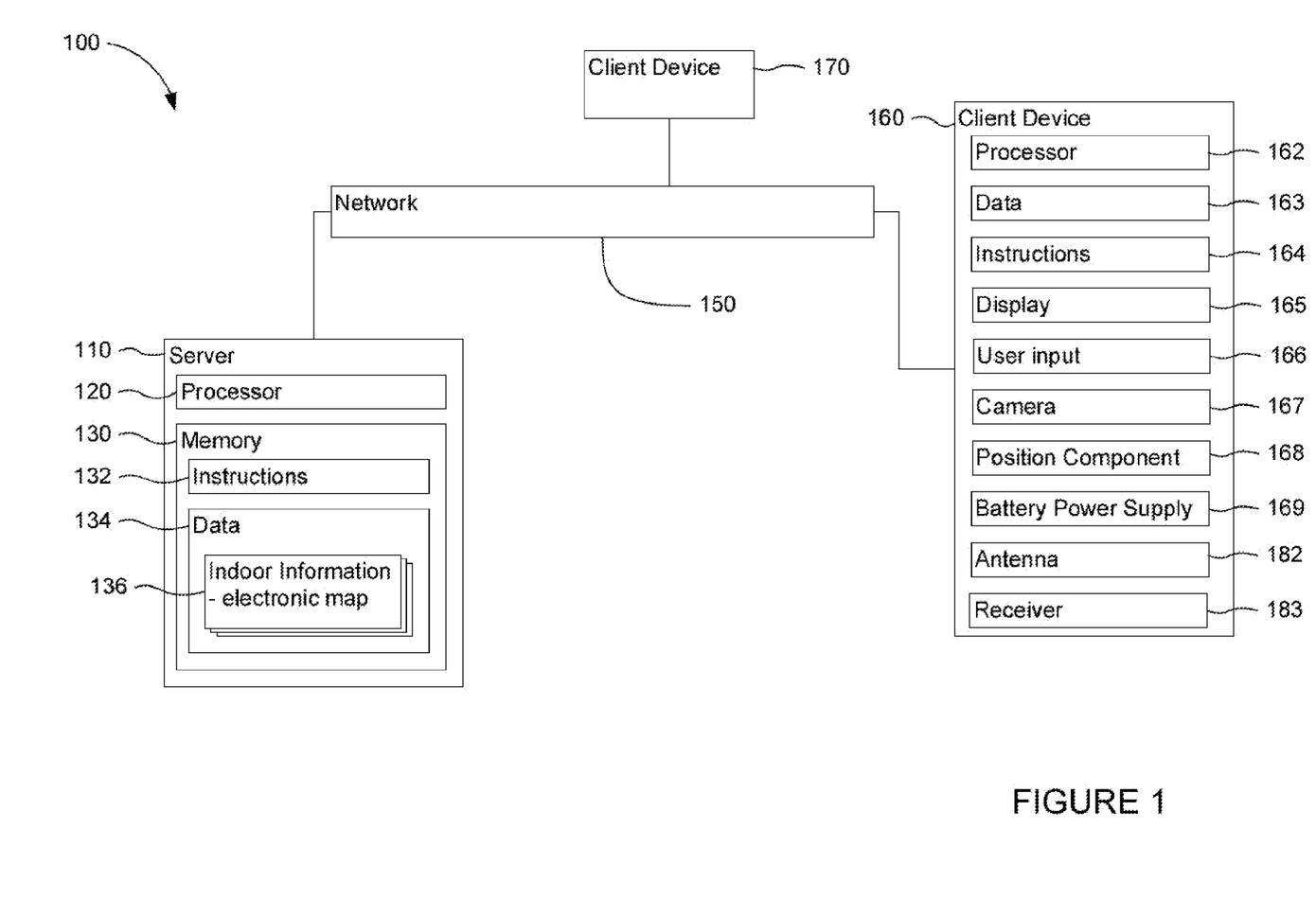
FIG. 1 is a functional diagram of a system in accordance with an example embodiment.
Figure 2:
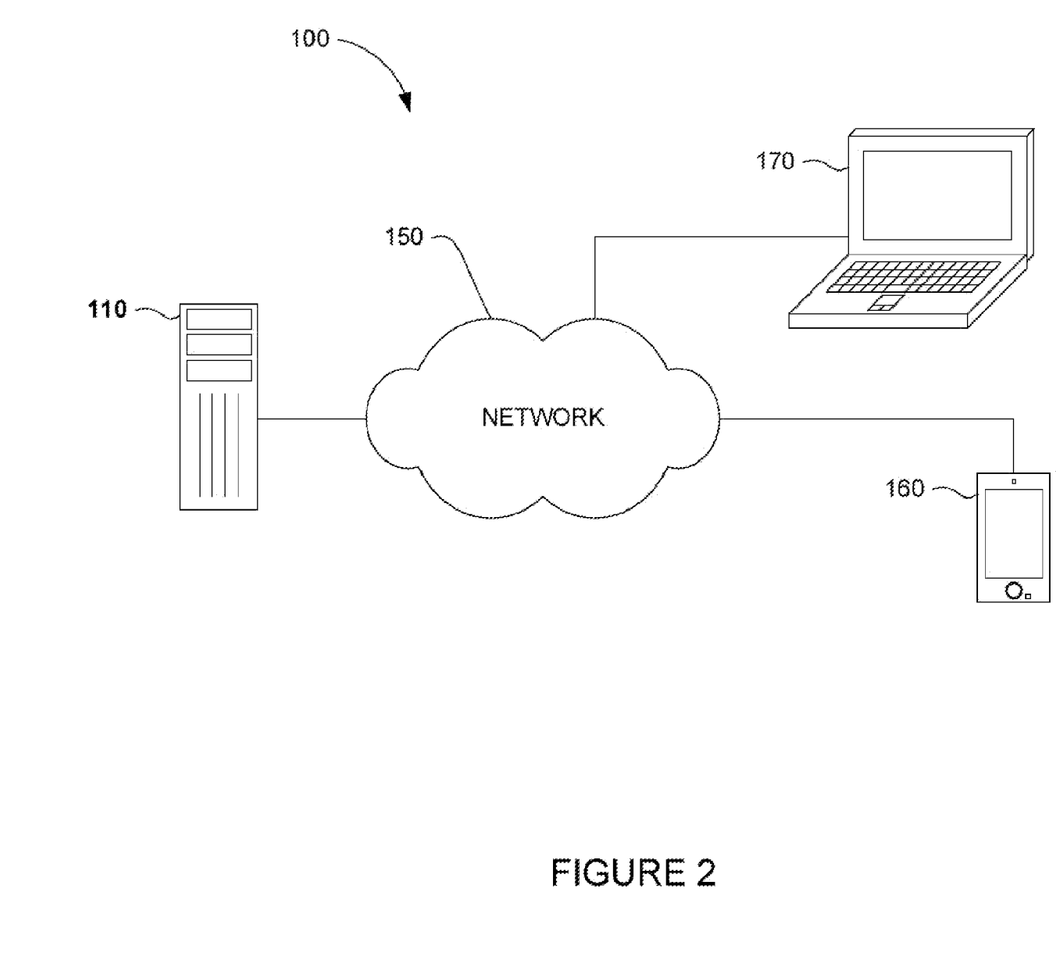
FIG. 2 is a pictorial diagram of the system of FIG. 1.

As shown in FIGS. 1 and 2, a system 100 in accordance with example embodiments includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor 120 may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

The client devices 160, 170 may include an antenna 182 and receiver 183 which may be used to scan the wireless network spectrum and identify local wireless network signals. For example, the antenna 182 may receive "beacon" messages and send them to the receiver 183 which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Users may be required to take an affirmative step in order to select or "opt-in" to participate. For example, users may be required to sign in to a service before providing any information and may be provided with an explanation of how and why their feedback is being used. Similarly, users may be provided with the opportunity to cease participation temporarily or permanently at any time. By requiring users to opt-in and sign in for the service, this may also reduce the amount of third parties attempting to spam the system. Over time, the system may determine whether the data provided by some users' devices is consistently at odds with that of other users, and disregard the information provided by inconsistent devices.

Each client device 160 may be configured similarly to the server 110, with a processor, memory and instructions as described above. Each client device 160 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device 160. For example, the geographical position component 168 may comprise a GPS receiver to determine the device's latitude, longitude and altitude. Thus, as the client device 160 changes locations, for example by being physically moved, the GPS receiver may determine a new current location. The position component 168 may also comprise software for determining the position of the client device 160 based on other signals received at the client device 160, such as signals received at a cellular phone's antennas from one or more cellular phone towers if the client device 160 is a cellular phone.

Although the client devices 160, 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad, voice recognition or a touch screen.

Data 134 of server 110 may include indoor information 136 that identifies different features of an indoor location to be navigated. The indoor information 136 may include an electronic version of a map that is provided by a user of the client device 160 or 170 and that is processed at the server 110.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 3:
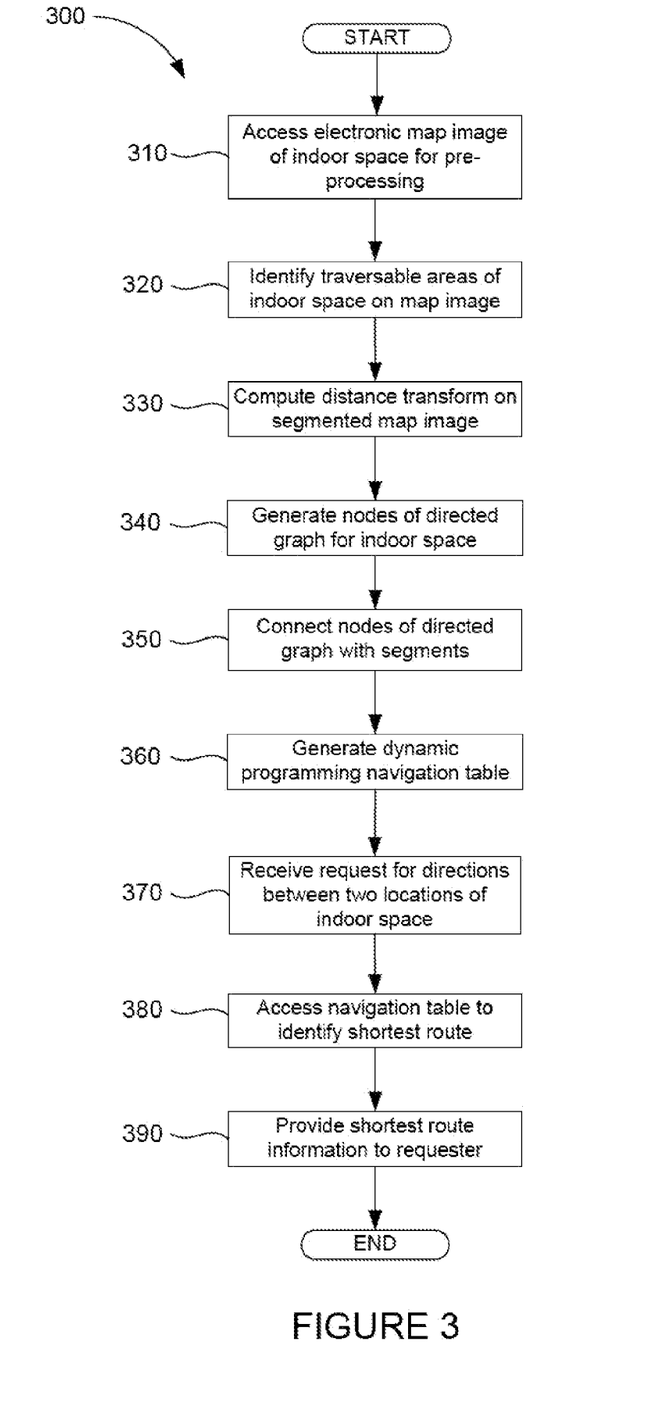
FIG. 3 is a flow diagram in accordance with an example embodiment.

FIG. 3 demonstrates a process 300 of providing navigation path planning in an indoor space using a directed graph generated from a map image. The indoor space may be any area that a client wants to have processed in order to provide directions to locations in the indoor space. Exemplary indoor spaces may include any building such as a dwelling, a hotel, an office space, a museum, a retail outlet, a warehouse, an exhibition hall, or a sporting event space. The client may want to provide end users with visual information about how to navigate the indoor space and to locate specific objects, fixtures and points of interest within the indoor space.

In one illustrative example, a visitor to a museum may desire to locate a specific work of art in the building. The visitor would be able to identify a route to the desired location by accessing a map of the indoor space using her mobile device. In another example, the indoor space map may assist first responders to an emergency. When responding to an alarm, a firefighter often enters unfamiliar buildings or locations. The indoor space map of the building provides the firefighter with quick access to the building's floor plan. The map may also provide specific routes to locations where potential victims may be trapped and other critical locations, such as a main gas line shut-off valve.

The process 300 begins when an electronic map image of an indoor space is accessed from a user (block 310). The user may upload the map image to a network for access by a server for processing. The map image provides a pictorial description of the indoor space (e.g., a floor plan). The map may be any electronic version ranging from a crude sketch to a blueprint image to a detailed computer-aided design (CAD) file. The map may be preliminarily processed into a bitmap form such that the map image can be converted to data that may be processed to identify routes between different locations in the indoor space. For example, extraneous information is removed from the map image such as legends, doors and labels. In addition, some information may be manually added to the map image such as labels that identify particular features, objects or other points of interest in the indoor space.

Navigable areas of the indoor space are identified on the map image to create a segmented map image (block 320). The navigable areas of the indoor space may be distinguished from non-navigable areas on the map using, for example, different colors. Examples of navigable areas include entryways, rooms, hallways and open areas. Examples of non-navigable areas include walls, support columns, and elevator shafts.

A distance transform is computed on the segmented map image to produce a distance map of the navigable areas (block 330). The distance map represents a distance from any pixel in the navigable area to a nearest non-navigable point. Each pixel is provided with a value that represents a likelihood that a route passes through the corresponding map location. In one illustrative example of a distance map, pixels at the center of corridors and rooms have higher values than pixels near walls or other obstructions. In some embodiments, a Gaussian filter is applied to the distance map to provide smoother transitions between values of adjacent pixels.

Nodes of a directed graph are generated for the indoor space (block 340). An algorithm is executed and starts at the pixel with the highest value in the distance map. The pixel with the highest value is a natural point for realistic paths to travel through. This initial point is referred to as an "anchor" point and may be the first node in the directed graph. Using the anchor point, a set of "front" points are initialized. The algorithm repeatedly propagates the set of front points by determining a new set of connected neighboring points of all points within the existing front point set. This process continues until a front point becomes broken into two or more "disjoint" point sets.

The point having the highest distance map value is located for each disjoint point set. This point is referred to as a "terminal" point. For each terminal point, a minimum cost path is found from the terminal point to the anchor point through the distance map. The minimum cost path may be determined using different shortest path graph algorithms.

Once a continuous minimum cost path is found, a set of points along the path is identified that, when interpolated with lines between the points, has a maximum per-pixel deviation from the path. A value corresponding to the maximum deviation may be varied to trade-off path accuracy for graph compactness. These points are added and linearly connected together in the directed graph.

After this process is executed for each terminal point, the process starts anew for each separate front point set with the terminal points becoming new anchor points for each front point. For subsequent iterations, paths are found from terminal points to all anchor points associated with the set. The anchor point of the set that is associated with the shortest path is used as a node when generating the directed graph.

The nodes of the directed graph are connected with segments (block 350). Since there are multiple front point sets, different pairs of front point sets may be merged together such that an individual terminal point may be located for the combined front point set. Paths represented by segments between nodes are identified and added to the directed graph from the individual terminal point to the anchor points of both front point sets. When a front point set becomes empty, a corresponding path is added to the graph if the front point set has existed for a predetermined minimum amount of time above a threshold. This eliminates branches of the directed graph into small pockets at spaces that would not commonly be navigated by a person.

Once all of the front point sets have terminated, the directed graph represents full coverage of the traversable area of the indoor space. Accordingly, the directed graph may be used for efficiently generating optimal routes between any locations in the indoor space. In some embodiments, an additional post-processing step may be performed to bypass neighboring nodes. In other words, a segment is created from a node to a different node by skipping over a node that is closer to the initial node to generate straighter and smoother paths in open areas.

After the directed graph is generated for the indoor space, a dynamic programming navigation table is created to provide navigation information between two locations in the indoor space (block 360). A shortest route through the directed graph is computed from each node to all other nodes in the directed graph. The first nodes in each path may be stored as a row in the navigation table. Each entry ($A_{i,j}$) in the navigation table is a first node in the shortest route from node i to node j.

The size of the navigation table is N×N, where N=the number of nodes. However, the navigation table may be stored in compact form. Since each node has only a few neighboring nodes (e.g., most nodes have only two neighboring nodes), each row consists of only a few different values. In addition, paths to adjacent nodes in the row usually start in the same direction such that adjacent row entries likely contain the same value. To take advantage of these properties, each row may be run length encoded for compact representation. Further compression schemes may also be applied to the run length encoded table for even greater compactness at a cost of greater computation to extract the table values for navigation.

After the navigation table is constructed, a request is received for a route between two locations (e.g., between point A and point B) in the indoor space (block 370). An end user may request directions from her mobile device to navigate the indoor space. The end user may request the directions to locate and identify specific objects, fixtures and points of interest in the indoor space. For example, the end user may enter an unfamiliar building and request directions from the entrance to the nearest restroom in the building.

The navigation table is accessed to identify the shortest route between the two locations (block 380). To navigate between any two nodes (i and j) using the navigation table, row i of the table is accessed and a value corresponding to the $j^{th}$ column is selected. This value is referred to as "k". Next, row k of the table is accessed and the value in the $j^{th}$ column is selected. This process is repeated until node j is reached in the navigation table.

The process for identifying a navigable route between two locations in the indoor space may be executed quickly and is suitable for mobile device hardware. Once a navigable route has been generated using the table, continuous curves are provided through points along the route to provide a more realistic path using, for example, circular radii to interpolate between segment transitions.

The shortest route between the requested locations in the indoor space is then provided in the form of directions to the requester (block 390). The requester may receive the directions at his mobile device. In some embodiments, the directions are provided on a map image with the requester's current location and requested destination indicated on the map with a visual indicator providing the shortest route from the current location to the requested destination.

In one illustrative example, an end user may desire to identify an emergency exit upon entering a building. In response to the request, the end user's mobile device may be provided with the location of the emergency exit and directions to the emergency exit indicated on a map. Processing then terminates.

Figure 4:
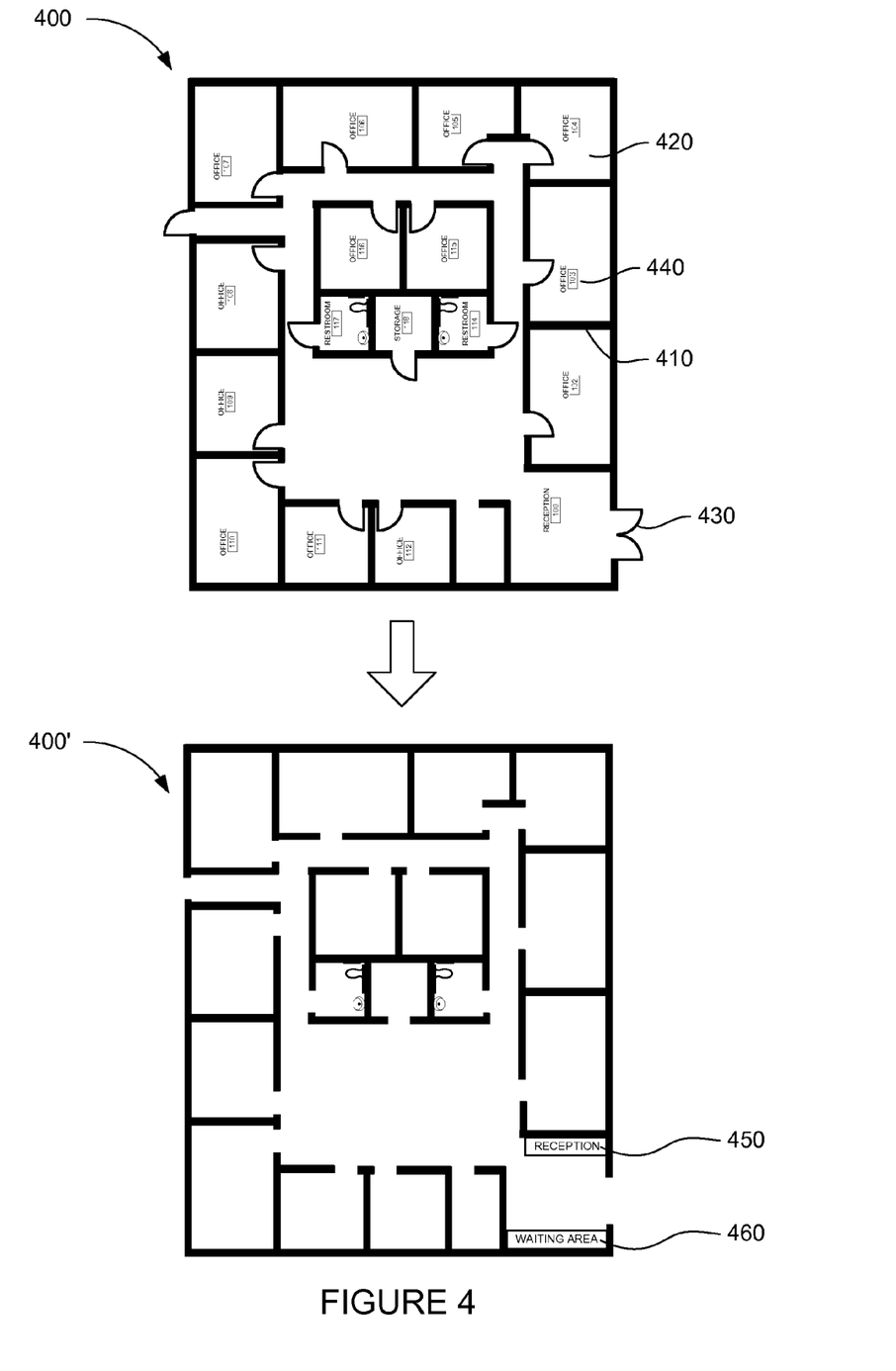
FIG. 4 illustrates pre-processing of a map of an indoor space in accordance with example embodiments.

FIG. 4 illustrates a preliminary map 400 received from a user and a version of the preliminary map that has been pre-processed to generate pre-processed map 400'. The preliminary map 400 may be an electronic illustration that depicts an indoor space. For example, the map 400 may illustrate a floor plan of a building. Accordingly, the map 400 may include a depiction of walls 410, rooms 420 and doorways 430 that are included on one level of the building. The map 400 may also include identifiers 440 that are used to identify specific points of interest such as a name or number for identifying a specific room.

For purposes of description, the map 400 illustrates a ground floor of an office. However, the map 400 may be used to depict any indoor space. In this case, building management may desire to have a map of the office available for access such that visitors to the office may download the map to assist them in navigating the office and locating specific points of interest.

A user may upload the preliminary map 400 to a network for access by a server for processing. The preliminary map 400 may be processed as an image file to generate the pre-processed map 400'. The pre-processed map 400' may be a bitmap that does not necessarily include all information from the preliminary map 400. In one illustrative example, the pre-processed map 400' does not include the doorways 430 or the identifiers 440. In addition, a distinction is made on the pre-processed map 400' between navigable areas and un-navigable areas. In some embodiments, the navigable areas may be distinguished from the un-navigable areas using different colors. As shown in the drawing, the navigable areas (e.g. rooms, hallways, doorways, etc.) are illustrated in white and the un-navigable areas (e.g. walls) are illustrated in black. In some embodiments, a user may include identifying data 450, 460 on the pre-processed map 400' to identify specific points of interest that may be considered important to end users who access the indoor space. As shown in the drawing, the user may identify areas near an entrance as "reception" or "waiting area."

Figure 5:
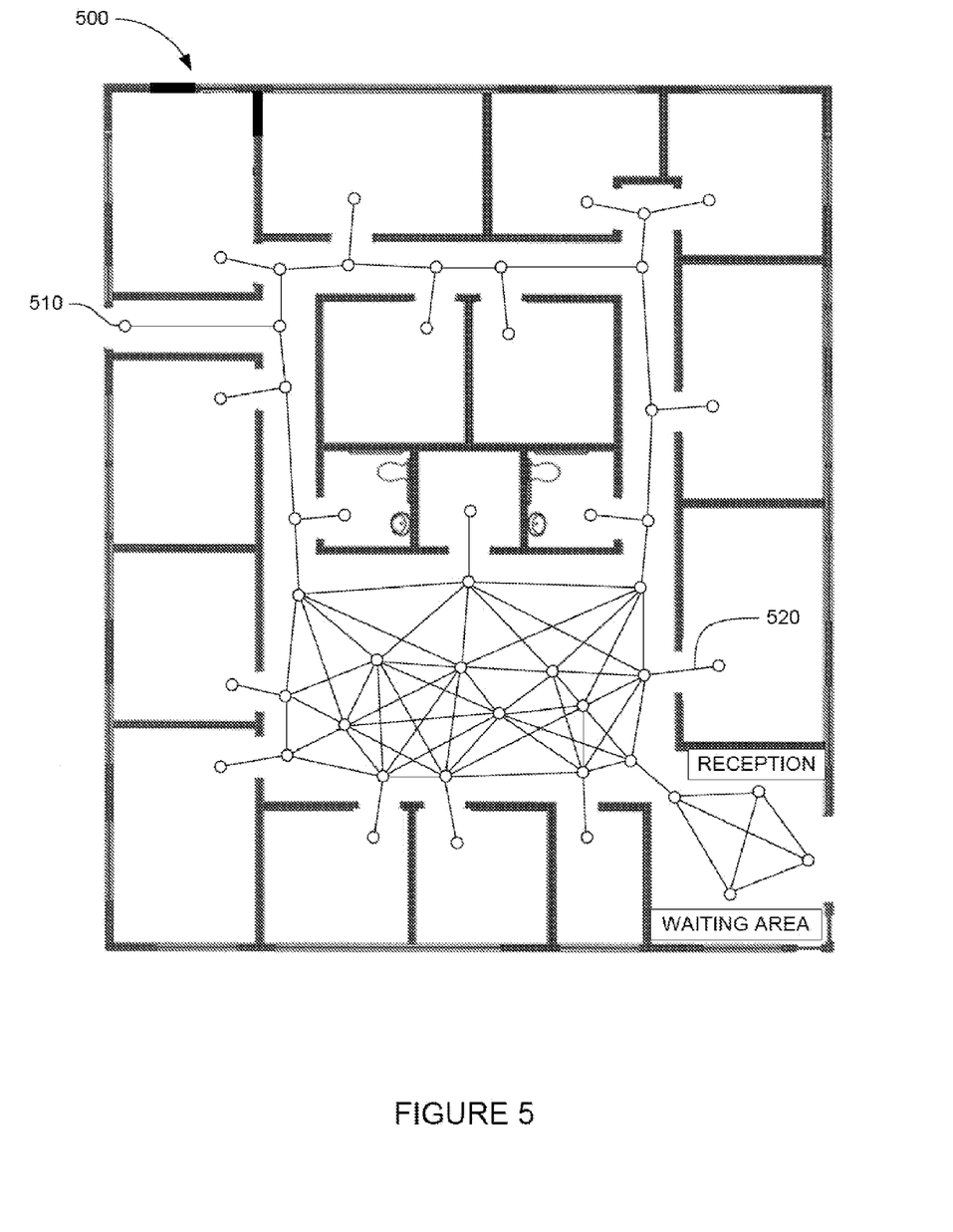
FIG. 5 illustrates a directed graph associated with the indoor space in accordance with example embodiments.

FIG. 5 illustrates a processed version of the map. As discussed above with reference to FIG. 3, a distance transform is executed on the pre-processed map 400' as a part of a process to produce a directed graph represented by navigation map 500. As shown on the navigation map 500, the directed graph includes a plurality of nodes 510 provided throughout the navigable area of the indoor space. The navigation graph also includes a plurality of paths 520 provided between nodes 510. A navigation table may then be constructed based on the directed graph such that a navigable route may be established in the indoor space between any two nodes along paths that connect the nodes.

Figure 6:
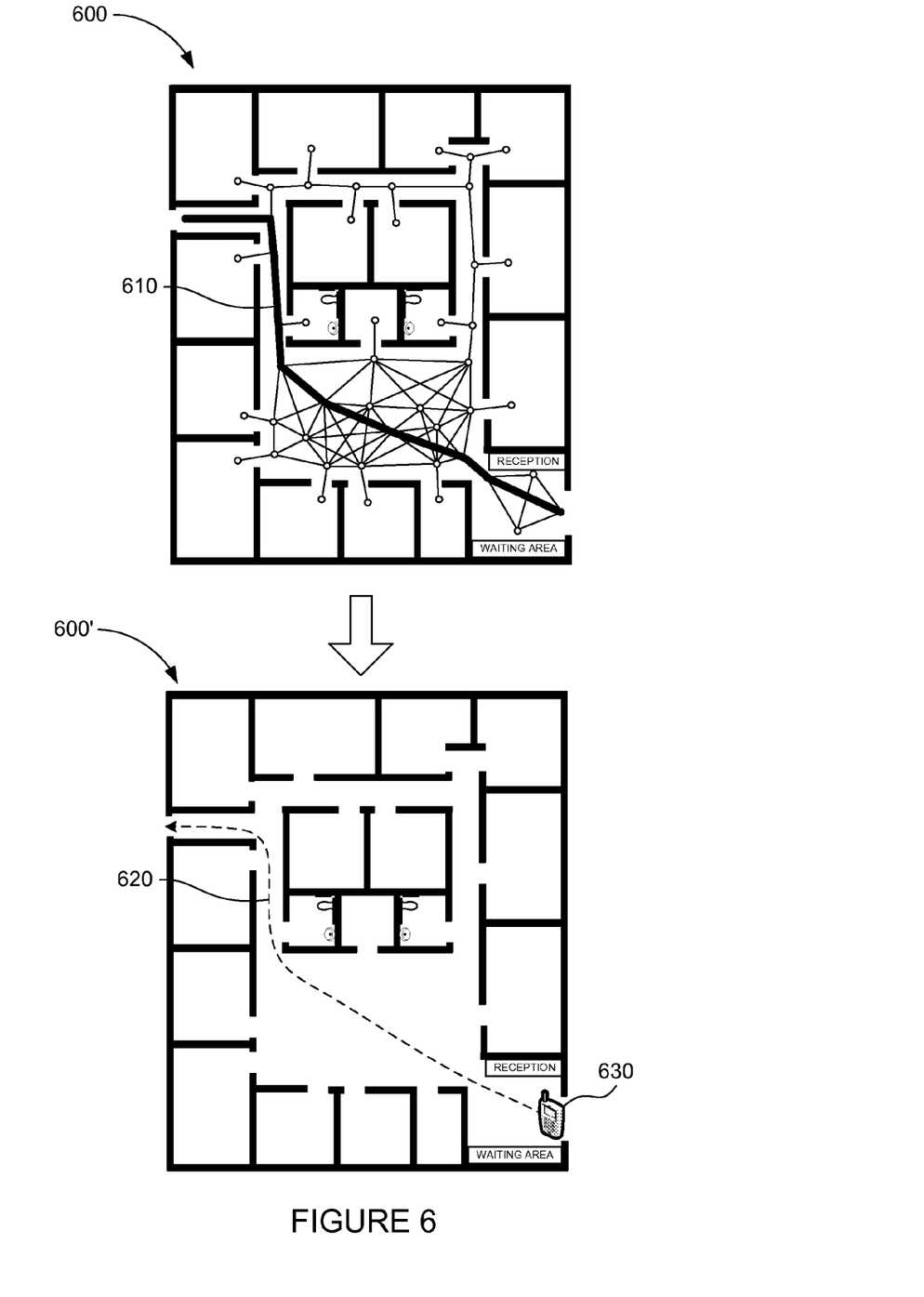
FIG. 6 illustrates a route provided to an end user in response to a request for directions to a location in the indoor space in accordance with example embodiments.

FIG. 6 illustrates a route that may be provided in response to a request for directions to a specific location in the indoor space. In one illustrative example, an end user may request to locate an emergency exit in the indoor space. As discussed above, the navigation table is accessed to identify the shortest route between two locations. The beginning of the route may be the user's current location or an identified location in the indoor space (e.g., the building entrance).

As shown in the drawing, the shortest route between the two locations may be provided along the paths between nodes of the directed graph on the navigation map 600. This may result in an initial route 610. The initial route 610 may not be a realistic indication of a route that a person would actually follow due to any rigid transitions between different paths of the directed graph at the nodes. Accordingly, in some embodiments, the initial route 610 is processed to generate a finalized route 620, as shown in finalized map 600'. The finalized route 620 provides a more realistic indication of a path that a person would actually follow to reach the desired destination.

The finalized map 600' may then be displayed on the end user's mobile device 630 with the finalized route 620 highlighted on the finalized map 600' for the end user to follow. As shown in the drawing, the end user may elect to follow the finalized path 620 which begins at an entrance and terminates at an emergency exit. The mobile device 630 may prompt the end user to move along the finalized path 620 by providing, for example, audible directional commands or by displaying the finalized map 600' and outlining the finalized path 620 for the end user to follow.

As described above, a map of an indoor space is processed to identify navigable areas of the indoor space. A distance transform is executed on the map as part of a process to generate a directed graph that corresponds to the navigable areas. The directed graph includes a plurality of nodes and a plurality of paths that connect the nodes. The nodes correspond to points in the indoor space and the paths correspond to routes between the points. A navigation table is generated based on the directed graph to identify the routes from each node to at least one other node in the directed graph. In response to a request for directions to a location in the indoor space, the navigation table is accessed to identify the shortest route to the requested location. The identified route is then provided to a mobile device such that an end user may navigate to the location.

As these and other variations and combinations of the features discussed above can be utilized without departing from the scope of the claims, the foregoing description of exemplary embodiments should be taken by way of illustration rather than by way of limitation as defined by the claims. It will also be understood that the provision of example embodiments (as well as clauses phrased as "such as," "e.g.", "including" and the like) should not be interpreted as being limited to the specific examples; rather, the examples are intended to illustrate only some of many possible aspects.

The invention claimed is:

1. A computer-implemented method comprising:
accessing, by one or more processors, a preliminary map associated with an indoor space;
converting, by the one or more processors, the preliminary map into a segmented map, wherein the segmented map distinguishes a navigable area of the indoor space from a non-navigable area of the indoor space;
generating, by the one or more processors, a directed graph corresponding to the indoor space based on the segmented map, the directed graph comprising a plurality of nodes connected by a plurality of paths, the plurality of nodes corresponding to points of a set of points in the navigable area of the indoor space and the plurality of paths corresponding to routes between the points, wherein the directed graph is generated by:
  executing a distance transform on the segmented map to generate a distance map, wherein the distance map identifies, for each point of the set of points in the navigable area, a distance between that point to a nearest point in the non-navigable area;
  for each point of the set of points in the navigable area, identifying a value that indicates a likelihood that a route would pass through that point, the value based on a position of that point in the indoor space;
  generating the plurality of nodes for the directed graph based on the values by:
    generating a first node at a point having a highest value of the values in the navigable area,
    generating a first set of at least two nodes connected to the first node, each node in the first set being at a point in the navigable area having a value of the values higher than the values of neighboring points, and
    generating a second set of nodes connected to at least one node in the first set, each node in the second set being at a point in the navigable area having a value of the values higher than the values of neighboring points;
generating the plurality of paths for the directed graph based on the plurality of nodes, the plurality of paths corresponding to routes between the first node and the first set of nodes and between the first set of nodes and the second set of nodes;
storing, by the one or more processors, the directed graph for subsequent access to identify a route between two locations in the indoor space;
receiving, by the one or more processors, a request for directions to a location in the indoor space; and
displaying, by the one or more processors, a route to the location based on the directed graph on an electronic display.

2. The method of claim 1, further comprising:
generating a navigation table based on the directed graph, wherein the navigation table is generated by identifying a shortest route from each node to at least one of the plurality of nodes in the directed graph; and
accessing the navigation table to identify a route to the requested location.

3. The method of claim 2, wherein the request is received from a mobile device, and further comprising providing the directions corresponding to the route to the mobile device in response to the request.

4. The method of claim 3, wherein the route indicates a shortest path that the end user would realistically follow to reach the requested location.

5. The method of claim 4, further comprising:
   identifying a location of the mobile device in the indoor space; and
   indicating the identified location on the route displayed on the mobile device.
6. The method of claim 5, wherein identifying the location of the mobile device in the indoor space based on wireless beacon data.
7. The method of claim 1, wherein the preliminary map and the segmented map are processed as images.
8. The method of claim 1, wherein converting the preliminary map into the segmented map comprises removing extraneous information from the preliminary map, wherein the extraneous information is not required to generate the directed graph.
9. A computer-implemented method for processing a map to provide guidance for navigating an indoor space, the method comprising:
   Accessing, by one or more processors, a preliminary map associated with the indoor space;
   Converting, using the one or more processor, the preliminary map into a segmented map, wherein the segmented map distinguishes a navigable area of the indoor space from non-navigable area of the indoor space;
   For each point of a set of points in the navigable area, identifying, by one or more processors, a distance between that point to a nearest point in the non-navigable area of the indoor space;
   For each point of the set of points in the navigable area, identifying, by the one or more processors, a value that indicates a likelihood that a route would pass through that point based on a position of that point in the indoor space;
   Generating, by the one or more processors, a directed graph corresponding to the indoor space based on the values by executing a distance transform on the segmented map to generate a distance map, wherein the distance map is used to identify the distance between each point of the set of points in the navigable area to the nearest point in the non-navigable area of the indoor space, the directed graph comprising a plurality of nodes connected by a plurality of paths, the plurality of nodes corresponding to points of the set of points in the navigable area, and wherein the plurality of paths are generated based on the plurality of nodes, corresponding to routes between the plurality of nodes;
   Generating, by the one or more processors, a navigation table based on the graph by:
      Computing a shortest route between every pair of nodes, each pair of nodes comprising a first node and an ending node,
      Determining a next node in a given shortest route for a given pair from the first node to the ending node, and
      Storing an identifier for the next node in the navigation table in association with the first node and the ending node;
   Receiving, by the one or more processors, a request for directions to a location in the indoor space; and
   Displaying, by the one or more processors, a route to the location based on the directed graph on an electronic display.
10. The method of claim 9, further comprising accessing, by the one or more processors, the navigation table to identify a route to the requested location.
11. The method of claim 10, wherein the request is received from a mobile device, and further comprising providing the directions corresponding to the route to the mobile device in response to the request.
12. The method of claim 11, wherein the route indicates a shortest path that an end user would realistically follow to reach the requested location.
13. The method of claim 12, further comprising:
   identifying, by one or more processors, a location of the mobile device in the indoor space; and
   indicating, by the one or more processors, the identified location on the route displayed on the mobile device.
14. The method of claim 9, wherein the navigation table is generated by identifying the shortest route from each node to each of the plurality of nodes in the directed graph.
15. The method of claim 9, wherein the preliminary map and the segmented map are processed as images.
16. The method of claim 9, wherein converting the preliminary map into the segmented map comprises removing extraneous information from the preliminary map, wherein the extraneous information is not required to generate the directed graph.
17. A system comprising:
   An electronic display; and
   One or more computing devices, each computing device comprising one or more processors, the one or more computing devices being configured to:
      Access a preliminary map associated with the indoor space
      Convert the preliminary map into a segmented map, wherein the segmented map distinguishes a navigable area of the indoor space from a non-navigable area of the indoor space;
      For each point of a set of points in the navigable area, identify a distance between that point to a nearest point in the non-navigable area of the indoor space;
      For each point of the set of points in the navigable area, identify a value that indicates a likelihood that a route would pass through that point, the value based on a position of that point in the indoor space;
      Generate a directed graph corresponding to the indoor space based on the values by executing a distance transform on the segmented map to generate a distance map, wherein the distance map is used to identify the distance between each point of the set of points in the navigable area to the nearest point in the non-navigable area of the indoor space, the directed graph comprising a plurality of nodes connected by a plurality of paths, the plurality of nodes corresponding to points of the set of points in the navigable area, and wherein the plurality of paths are based on the plurality of nodes, corresponding to routes between the plurality of nodes;
      Generate a navigation table based on the graph by:
         Computing a shortest route between every pair of nodes, each pair of nodes comprising a first node and an ending node,
         Determining a next node in a given shortest route for a given pair from the first node to the ending node, and
         Storing an identifier for the next node in the navigation table in association with the first node and the ending node;
      Receive a request for directions to a location in the indoor space; and
      Display a route to the location based on the directed graph on the electronic display.

* * * * *

UNITED STATES PATENT AND TRADEMARK OFFICE
CERTIFICATE OF CORRECTION

PATENT NO. : 9,291,460 B2  
APPLICATION NO. : 13/188798  
DATED : March 22, 2016  
INVENTOR(S) : Scott Ettinger and Ehud Rivlin Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this
Twenty-eighth Day of June, 2016

Michelle K. Lee
*Director of the United States Patent and Trademark Office*